UNITED STATES PATENT OFFICE.

ROBERT GANS, OF PANKOW, NEAR BERLIN, GERMANY, ASSIGNOR TO J. D. RIEDEL, AKTIENGESELLSCHAFT, OF BERLIN, GERMANY, A CORPORATION OF GERMANY.

PROCESS FOR SOFTENING WATER.

960,887. Specification of Letters Patent. Patented June 7, 1910.

No Drawing. Application filed December 16, 1909. Serial No. 533,350.

*To all whom it may concern:*

Be it known that I, ROBERT GANS, chemist, subject of the German Emperor, residing at Pankow, near Berlin, Germany, have invented a certain new and useful Process for Softening Water, of which the following is a specification.

For softening water two processes are principally employed. One precipitates the lime and the magnesia in the water by the addition of lime and soda, the other by the addition of lime and baryta. Both processes suffer from the disadvantage that in the softening of cold water the precipitation of the lime and of the magnesia does not take place instantaneously, but only after a comparatively long time. It is also impossible to obtain complete softening by one of the said processes. These disadvantages are avoided by the following process, which utilizes the property of zeolites to absorb caustic lime or caustic baryta, and when brought into contact with the bicarbonates and sulfates of lime and of magnesia, to give up to these salts the bases thus absorbed. In this manner carbonates of lime, magnesia or baryta or sulfate of baryta are formed and by the removal of these bodies the hardness of the water disappears. Complete softening may also be obtained by the addition alone of lime to zeolites, whereby the bicarbonates of lime and magnesia are precipitated, if the water so treated be caused to pass through a supplemental filter of sodium-zeolite, which converts also the sulfates, nitrates and chlorids of lime and magnesia into the corresponding sodium salts by exchange of the bases.

It is only necessary to take care, that the filter does not become choked, by frequently stirring up and skimming off the precipitated lime-magnesia- and baryta-salts. It is advantageous also to employ upward filtration, the fine-grained precipitates being washed off out of the filter, after which filtration is performed in a second filter, for which purpose among others a sodium-zeolite filter is particularly suitable. The zeolites of the second or supplemental filter, which by this process are gradually converted into calcium- and magnesium-zeolites, are re-generated from time to time by the addition of solutions of common salt.

In comparison with softening by zeolites alone the present process has the advantage, that it partially employs cheaper reagents in the form of lime, and that it permits of a considerably greater speed of filtration and consequently requires a smaller filtering surface. In comparison with the lime-soda process the present process likewise offers very important advantages. It permits of the use of the cheapest precipitating and re-generating agents, namely caustic lime for hardness due to carbonate, and chlorid of sodium for hardness due to sulfates, in the regeneration of the zeolites. Furthermore the accurate proportioning of the lime in a dissolved form by the so-called lime saturator, as required by the lime-soda process, is dispensed with, as the zeolites possess the hitherto unknown property of adding alkalinity and of giving it up again on contact with bicarbonates. In this case therefore the zeolites undertake the aforesaid proportioning, which otherwise is difficult to carry out on a commercial scale. In the lime-zeolite-process the separation of the lime takes place almost instantaneously in the layer of the zeolite containing the free caustic lime, while in the lime-soda process a comparatively long time is necessary after the addition of the soda for completing the reaction, a circumstance which renders a larger plant (water reservoirs) necessary. The softening of the same quantities of water consequently necessitates according to the present process a far smaller space than according to the known process. Finally complete softening to zero degree is not practicable with the lime-soda process, but may be obtained with the lime-zeolite process.

The effects obtained in the present process by the alkaline earths can be obtained in the filtration of the water also by the continuous addition of the hydroxids and carbonates of alkalies. In this case also the zeolites undertake the accurate proportioning, as they absorb the alkalinity in a manner similar to that of the alkaline earths and give it up again to the bicarbonates of the water.

Example I: Water of 10 German degrees of hardness,—viz., water containing ten parts by weight of lime and magnesia in 100,000 (one hundred thousand) parts of water of which 9 degrees are caused by bicarbonates and 1 degree by other salts of the earth-alkalies, is mixed with 130 mg. of hydrate of lime and 20 mg. of hydrate of baryta per liter and filtered at once through a comparatively thick layer of sodium zeolite. By this treatment perfect softening is obtained, as the lower layer of the zeolites acts as a supplementary filter and converts the nitrates, chlorids and undecomposed sulfates of lime and magnesia still present into the corresponding sodium salts.

Example II: To the above water of 10 degrees of hardness are added 132 mg. of hydrate of lime and the water is filtered at once through a layer of sodium zeolite, the filtration taking place from the bottom upward. In this filter is completed the conversion of the bicarbonates of the lime and magnesia in the water into carbonates, which however, when the speed of filtration is high, pass through the layer of zeolite and render the water turbid. To clarify this water it is filtered through a supplemental filter of sodium-zeolite, which at the same time converts the remaining lime- and magnesia-salts into sodium salts. The softening is perfect. The supplemental filter requires frequent rinsing and regeneration by common salt.

Example III: Water of 10 German degrees of hardness receives per liter an addition of 190 milligrams of soda and is immediately, without waiting for the completion of the reaction, filtered off through a layer of sodium zeolite, the speed of filtration being 10 meters and more per hour. Water of 1 to 2 degrees of hardness results. The slime deposited in the zeolite filter is removed by rinsing backward, as soon as it checks the speed of filtration.

The process may obviously be also employed for the removal of iron and manganese from water.

What I claim is:—

1. The process for softening water, which consists in mixing the water with the hydroxid of an alkaline earth and then filtering it through zeolite, substantially as described.

2. The process for softening water, which consists in mixing the water with hydroxid of lime and filtering it through a sodium-zeolite, substantially as described.

3. The process for softening water, which consists in mixing the water with the hydroxid of an alkaline earth, then filtering it through a layer of sodium-zeolite and finally passing it through a supplemental filter of sodium-zeolite, substantially as described.

In testimony whereof I have hereunto set my hand in presence of two subscribing witnesses.

ROBERT GANS.

Witnesses:
 AUGUST NEUMANN,
 CORNELIUS MASSACIU.